Nov. 10, 1931.  F. J. COX  1,830,826
REFRACTORY DIAPHRAGM FOR USE IN SURFACE COMBUSTION APPARATUS
Filed Aug. 17, 1925
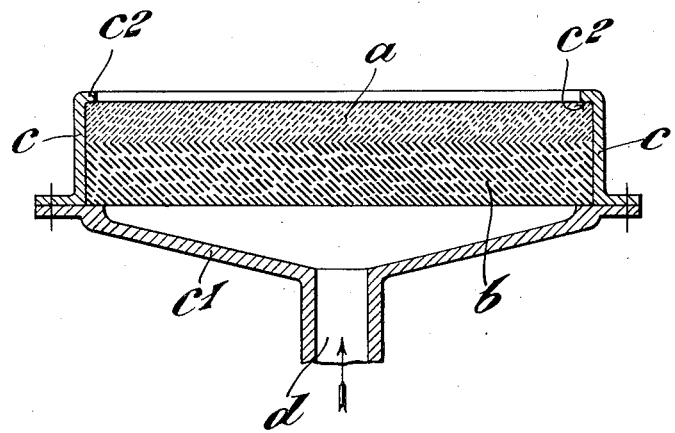
Inventor
Frederick John Cox
By
Liverance & Van Antwerp
Attorneys Patented Nov. 10, 1931

1,830,826

UNITED STATES PATENT OFFICE

FREDERICK JOHN COX, OF LONDON, ENGLAND

REFRACTORY DIAPHRAGM FOR USE IN SURFACE-COMBUSTION APPARATUS

Application filed August 17, 1925. Serial No. 50,888.

This invention relates to refractory diaphragms for use in surface combustion wherein an inflammable gas mixture is caused to pass under suitable pressure through a thickness of refractory material and burn only at the surface.

The present invention is concerned with the construction of the refractory diaphragms—or radiophragms or combustors as I call them—upon the exposed surface of which it is desired to effect the combustion. It has been found in practice hitherto that with diaphragms as at present constructed explosions are liable to occur in the mixing chamber and the object of the invention is to provide a diaphragm through which the inflammable gas or mixtures can pass satisfactorily to the combustion surface under suitable pressure but which will be of such a nature that the danger of an explosion in the mixing chamber is obviated.

The drawing illustrates a surface combustion burner including a radiophragm embodying this invention in operative position.

The burner comprises a base member $c^1$ having an inlet passage $d$ for the combustible gas and a cap is joined to the base member, said cap having a wall $c$ to enclose the edges of a radiophragm and flanges $c^2$ to retain the radiophragm, the cap being open between the flanges $c^2$ in which opening the surface combustion on the radiophragm occurs. The radiophragm is composed of the coarse stratum $b$ on the inner side adjacent the base $c^1$ of the burner and the fine stratum $a$ adjacent the outer surface on which outer surface the combustion occurs.

A diaphragm according to my invention consists of separate structures of strata of refractory materials superimposed one upon the other in a plastic condition during manufacture and caused, by stoving, to combine into a single integral structure having differing and distinct sectional constructions.

That is to say a complete diaphragm may consist of a thickness composed of granules of one grade bound together by a binding material and a thickness composed of granules of a smaller or finer grade also bound by the suitable binding material, the two layers being superimposed one upon the other so that when stoved they unite to form a single integral rigid structure.

In the manufacture of the diaphragms it has been found that not only is the nature of the refractory materials important but the method of making the diaphragms is also important.

In carrying the invention into practice, according to the preferred method, I take granules of a refractory material in which silica and alumina predominate and I have found that a material where the silica constituent ranges between 55% and 60% and the alumina constituent ranges between 30% and 35% is satisfactory.

These granules, which I term the large granules, are screened to a size of from 10 to 12 mesh per inch. I next provide small granules of the same or similar material screened to a size of from 16 to 20 mesh per inch.

The powder obtained during the grinding operations for obtaining the granules is also employed as will hereinafter appear.

I next take a refractory mixing powder in which silica and alumina also predominate, but in somewhat different proportions, a satisfactory material being one in which the percentage of silica ranges between 45% and 50% of the bulk and the percentage of alumina ranges between 35% and 40%.

The binding solution I employ is silicate of sodium having a density of 1250 as shown on a Twaddell densimeter.

Having prepared all the materials, they can be classified as follows:—

1. Large refractory granules, about 10 to 12 mesh.
2. Small granules about 16 to 20 mesh.
3. Fine refractory powder, as produced from grinding.
4. Refractory mixing powder.
5. Binding solution.

It is to be noted that it is important that the granules and powder be kept perfectly dry.

In the actual manufacture of the diaphragms the preferred quantities of each of the materials required for a given size of diaphragm can be ascertained by taking the area of the diaphragm in square inches and multiplying by the following decimal points which gives the weight in ounces of each of the materials.

|   | Oz. |
|---|---|
| 1. Large granules | .8 |
| 2. Powder of same material | .25 |
| 3. Refractory mixing powder | .05 |
| 4. Binding solution | .15 |
| 5. Small granules | .15 |
| 6. Powder of same material | .035 |
| 7. Refractory mixing powder | .015 |
| 8. Solution | .027 |

These diaphragms will finish 1½ inches thick and will be suitable for coal gas of 3 inch water pressure and upwards.

For a weak mixture of petrol air gas the following proportions are desirable.

|   | Oz. |
|---|---|
| 1. Large granules | .5 |
| 2. Powder of same material | .13 |
| 3. Refractory mixing powder | .025 |
| 4. Binding solution | .08 |
| 5. Fine granules | .1 |
| 6. Powder of same material | .025 |
| 7. Refractory mixing powder | .01 |
| 8. Binding solution | .02 |

These diaphragms will finish 1″ thick. The process of making the diaphragms is as follows:—

The large granules and the powder of the same material together with the refractory binding powder, are first mixed dry upon a tray. The binding solution is then added and the whole is thoroughly mixed.

When mixed together the ingredients will appear to be a substantially dry granular mass and will not appear to be plastic but it will be found that when compressed in a mould adhesion between the granules will occur.

Precisely the same mixing process is carried out separately with the small granules.

The mixture containing the large granules is now arranged evenly in a mould and is evenly pressed or rammed down into a slab. The upper surface of this slab is then roughened slightly and the mixture containing the small granules is then arranged evenly over this slab and the whole mass is evenly pressed together the amount of pressing or ramming required being readily seen since when the pressing is completed the mould will be exactly filled to the top, the mould being the exact thickness to suit the particular thickness of diaphragm required. The final surface of small granular material, which is the surface upon which combustion is effected, may be fluted or corrugated by means of a small roller or tool.

When finally moulded in the manner before described the diaphragm is stoved for about 1½ hours, at a temperature of about 200° F. and the final stoving is then effected for about 2 hours at a temperature of about 350° F.

The diaphragm can then be removed from the mould and is ready for use and will, as will be readily understood, consist of an integral and substantially rigid slab having two distinct and definite sectional structures or strata. The greater thickness will be composed of the large granules there being a comparatively thin layer of the smaller granules.

The diaphragms can be given any desired shape or form by means of suitable shaped moulds and where curved, irregular or circular shapes are desired temporary separators may be inserted between the strata during the formation of the radiophragm these separators being withdrawn prior to the stoving operation.

It will be found that with diaphragms of the foregoing nature and composition and construction, combustion will readily occur at the surface but there will be no tendency for the combustion to fire back through the diaphragm.

What I claim and desire to secure by Letters Patent is:—

1. A surface combustion radiophragm comprising two porous strata of granules, one stratum being made of granules of a larger size than the granules of the other stratum, the two strata being integrally joined to make an integral rigid porous structure, the stratum of larger granules forming the back of the radiophragm and the stratum of smaller granules forming the combustion surface thereof, said combustion surface being relatively smooth whereby the same is evenly heated and any tendency for the combustion to fire back is prevented.

2. A surface combustion radiophragm comprising two porous strata of granules, one stratum being made of granules of a larger size than the granules of the other stratum, the stratum of larger granules being thicker than the stratum of smaller granules, the two strata being integrally joined to make an integral rigid porous structure, the statum of larger granules forming the back of the radiophragm and the stratum of smaller granules forming the combustion surface thereof.

3. A surface combustion radiophragm comprising, a porous stratum of granules of refractory material of one size, a porous stratum of granules of refractory material of a larger size than those of the first stratum which is arranged above it, the stratum of larger granules being thicker than the stratum of smaller granules and the granules of each stratum and the strata themselves being connected together at their points of contact only, so as to maintain a porosity between the granules throughout the depth of the radiophragm.

4. A surface combustion radiophragm comprising, a porous stratum of granules of one size of a refractory material predominating in silica and alumina, the silica constituent ranging between fifty-five percent and sixty-five percent of the mass and the alumina constituent between thirty and thirty-five per cent of the said mass, a porous stratum of granules of the same refractory material but of a larger size than those of the first stratum which is arranged above it, the granules of each stratum and the strata themselves being connected together at their points of contact only, so as to maintain a porosity between the granules throughout the depth of the radiophragm.

In witness whereof I affix my signature.

FREDERICK JOHN COX.